United States Patent [19]
Uehlein-Proctor

[11] Patent Number: 6,102,633
[45] Date of Patent: Aug. 15, 2000

[54] FEED SYSTEM FOR A DRILL PRESS

[75] Inventor: Nancy Uehlein-Proctor, Wales, Wis.

[73] Assignee: Milwaukee Electric Tool Corporation, Brookfield, Wis.

[21] Appl. No.: 09/480,277

[22] Filed: Jan. 10, 2000

Related U.S. Application Data

[63] Continuation of application No. 09/054,120, Apr. 2, 1998, abandoned.

[51] Int. Cl.$^7$ .............................. B23B 45/00; B23B 47/18
[52] U.S. Cl. ........................... 408/129; 408/76; 408/136; 408/141; 408/241 G
[58] Field of Search ................................ 408/76, 99, 110, 408/111, 129, 136, 141, 234, 241 G, 710

[56] References Cited

U.S. PATENT DOCUMENTS

| | | | |
|---|---|---|---|
| 2,167,153 | 7/1939 | Hirsch | 144/305 |
| 2,385,712 | 9/1945 | Konikoff | 408/99 |
| 2,550,012 | 4/1951 | Krafka | 74/217 |
| 2,578,995 | 12/1951 | Emrick | 408/141 |
| 2,647,407 | 8/1953 | Hirvonen | 74/22 |
| 2,651,975 | 9/1953 | Soloff | 90/11 |
| 2,664,756 | 1/1954 | Fismer | 74/217 |
| 2,669,135 | 2/1954 | Moore | 77/5 |
| 2,814,216 | 11/1957 | Goodwin | 77/23 |
| 3,131,584 | 5/1964 | McFerren | 408/705 |
| 3,158,044 | 11/1964 | Jones | 408/234 |
| 3,314,312 | 4/1967 | Neihaus, Jr. et al. | 77/33.8 |
| 3,803,927 | 4/1974 | Lawler | 408/141 |
| 3,894,809 | 7/1975 | Hollins | 408/128 |
| 4,507,030 | 3/1985 | Jackson | 408/129 |
| 4,573,834 | 3/1986 | Nasu | 408/234 |
| 4,622,022 | 11/1986 | Diffenderfer et al. | 464/162 |
| 4,945,745 | 8/1990 | Bathory et al. | 72/249 |
| 5,354,159 | 10/1994 | Smith | 409/235 |
| 5,517,746 | 5/1996 | Cox et al. | 29/560 |

FOREIGN PATENT DOCUMENTS 1574343  9/1977  United Kingdom .

OTHER PUBLICATIONS

Milwaukee Electric Tool Corporation's Operator's Manual for Heavy–Duty 4245 Steel Hawg Permanent Magnet Metal Boring System, published before Apr. 2, 1997.

Black & Decker Industry & Construction's Instruction Manual for 1555, 1556 and 1557 Magnetic Drill Presses, published before Apr. 2, 1997.

USA 5000 Slugger Portable Magnetic Drilling Machine by Jancy Engineering Company Operator's Manual Model #18066 or #18080, published before Apr. 2, 1997.

Hougen Rotabroach Portable Magnetic Drills Operator's Manual Model 10904, published before Aprr. 2, 1997.

Fein 270 14/KBM 558–6–3 Operating Instructions (In English) by C. & E. Fein GmbH & Co., Stuttgart, Deutschland, published before Apr. 2, 1997.

*Primary Examiner*—Daniel W. Howell
*Attorney, Agent, or Firm*—Michael Best Friedrich LLP

[57] ABSTRACT

A feed system for a drill press. The drill press comprises a base for supporting the drill press on a surface, a housing supported on the base and defining an opening, a telescoping spindle assembly positioned for movement relative to the housing along an axis and for rotation about the axis, a motor operable to rotatably drive the spindle assembly, a drive system connected between the motor and the spindle assembly, and a feed system for moving the spindle assembly between a lowered position and a raised position. The feed system is supported by the housing so that a portion of the feed system is exposed through the opening. The drill press also comprises a flexible barrier member to cover the exposed portion of the feed system. The feed system includes a sprocket rotatably supported by the housing and a flexible member movably engaging the sprocket and connected to the spindle assembly such that rotation of the sprocket moves the spindle assembly between the lowered position and the raised position.

17 Claims, 4 Drawing Sheets

FEED SYSTEM FOR A DRILL PRESS

This application is a continuation of prior filed, formal U.S. patent application Ser. No. 09/054,120, filed on Apr. 2, 1998, now abandoned.

BACKGROUND OF THE INVENTION

The present invention generally relates to drill presses and, more particularly to a feed system for a drill press.

A conventional drill press generally includes a housing that is supported by a base, and a motor assembly that drives a rotating spindle. The spindle supports a drill bit. Generally, the motor assembly and the spindle are supported on the housing by a feed system, such as a rack and pinion assembly, so that the motor assembly and the spindle are movable relative to the housing. In this manner, the drill bit is movable into and out of engagement with a workpiece.

SUMMARY OF THE INVENTION

The rack and pinion assembly for a drill press described above has several problems. For example, in order to accommodate displacement of the rack relative to the pinion, increased overhead space is required for the drill press to be operated. Further, in a typical drill press, the motor assembly is movable with the drill bit and spindle, also increasing the required overhead space. However, the rack and pinion assembly would interfere with a motor assembly positioned on the stationary housing making such a stationary motor assembly unfeasible. Additionally, in a portable drill press, with the drill bit in the "up" or out-of-engagement position, the raised motor assembly and spindle make the drill press unwieldy.

The present invention provides a feed system for a power tool, such as a drill press, that attempts to alleviate the problems relating to existing feed systems for drill presses. In one aspect, the invention provides a drill press that includes a flexible member feed system to produce vertical travel of the drill bit within a limited space. To replace the rack and pinion assembly, the belt feed system utilizes a flexible member which is wrapped around a pair of sprockets.

Specifically, the present invention provides a drill press comprising a base for supporting the drill press on a surface, a housing supported by the base, a spindle positioned for movement relative to the housing along an axis and for rotation about the axis, and a motor supported by the housing and operable to rotatably drive the spindle. The spindle has an end adapted to support an output element, such as a drill bit. The spindle is movable along the axis between a lowered position, in which the output element is engageable with a workpiece, and a raised position, in which the output element is out of engagement with the workpiece.

The drill press also comprises a feed system for moving the spindle between the raised position and the lowered position. The feed system includes a flexible member interconnected with the spindle such that the spindle moves with the flexible member, and a feed mechanism movably supported by the housing and movably supporting the flexible member. Movement of the feed mechanism moves the flexible member so that the spindle is moved between the lowered position and the raised position.

Preferably, the flexible member is an endless loop belt. Also, the feed mechanism preferably includes a sprocket rotatably supported by the housing, and the sprocket is engaged by the flexible member such that rotation of the sprocket causes movement of the flexible member. In addition, the feed mechanism preferably further includes a handle interconnected with the sprocket to rotate the sprocket. Further, the feed mechanism preferably includes a second sprocket engaging the flexible member. The second sprocket is spaced from the first sprocket such that the flexible member is substantially tensioned between the first and second sprockets.

Preferably, the drill press further comprises a collar housing an end of the spindle so that the spindle is rotatable relative to the collar. The collar is movable relative to the housing and is connected to the flexible member so that movement of the feed mechanism moves the collar with the spindle. Additionally, the drill press further comprises a track extending parallel to the axis, and a portion of the collar extends into the track to limit movement of the collar relative to the housing.

Further, the spindle preferably includes a first spindle member axially fixed relative to the housing and a second spindle member supported for axial movement relative to the first spindle member and relative to the housing. The second spindle member is connectable to the flexible member such that the second spindle member telescopes out of the first spindle member to move to the lowered position and such that the second spindle member telescopes into the first spindle member to move to the raised position.

In another aspect, the invention provides a base, a housing defining an opening, a spindle positioned for movement relative to the housing, a motor to drive the spindle, and a feed system to move the spindle between the lowered position and the raised position. The feed system is supported by the housing such that a portion of the feed system is exposed through the opening. The drill press further comprises a flexible barrier member supported by the housing to cover the exposed portion of the feed system.

Preferably, the barrier member has an expanded condition when the spindle is in the raised position. Further, movement of the spindle from the raised position to the lowered position compresses the barrier member, and subsequent movement of the spindle from the lowered position to the raised position causes the barrier member to return to the expanded condition. The barrier member preferably has a corrugated configuration.

Also, the feed system preferably includes a sprocket and a flexible member, and the barrier member covers a portion of the flexible member. In addition, the drill press preferably further comprises a collar and a retaining member, and the barrier member is positioned between the collar and the housing. Also, the housing preferably defines a recess extending parallel to the axis, and a portion of the barrier member extends into the recess.

One advantage of the present invention is that the flexible member feed system reduces the overhead vertical space required for the operation of the drill press.

Another advantage of the present invention is that the flexible member feed system does not interfere with the drive system connecting the motor positioned on the stationary housing to the movable spindle.

Yet another advantage is that, in a portable drill press with the spindle is in the "up" or out-of-engagement position, the drill press is not unwieldy.

Other features of the invention will become apparent to those skilled in the art upon review of the following detailed description, claims and drawings.

DETAILED DESCRIPTION OF THE PREFERRED EMBODIMENT

Figure 1:
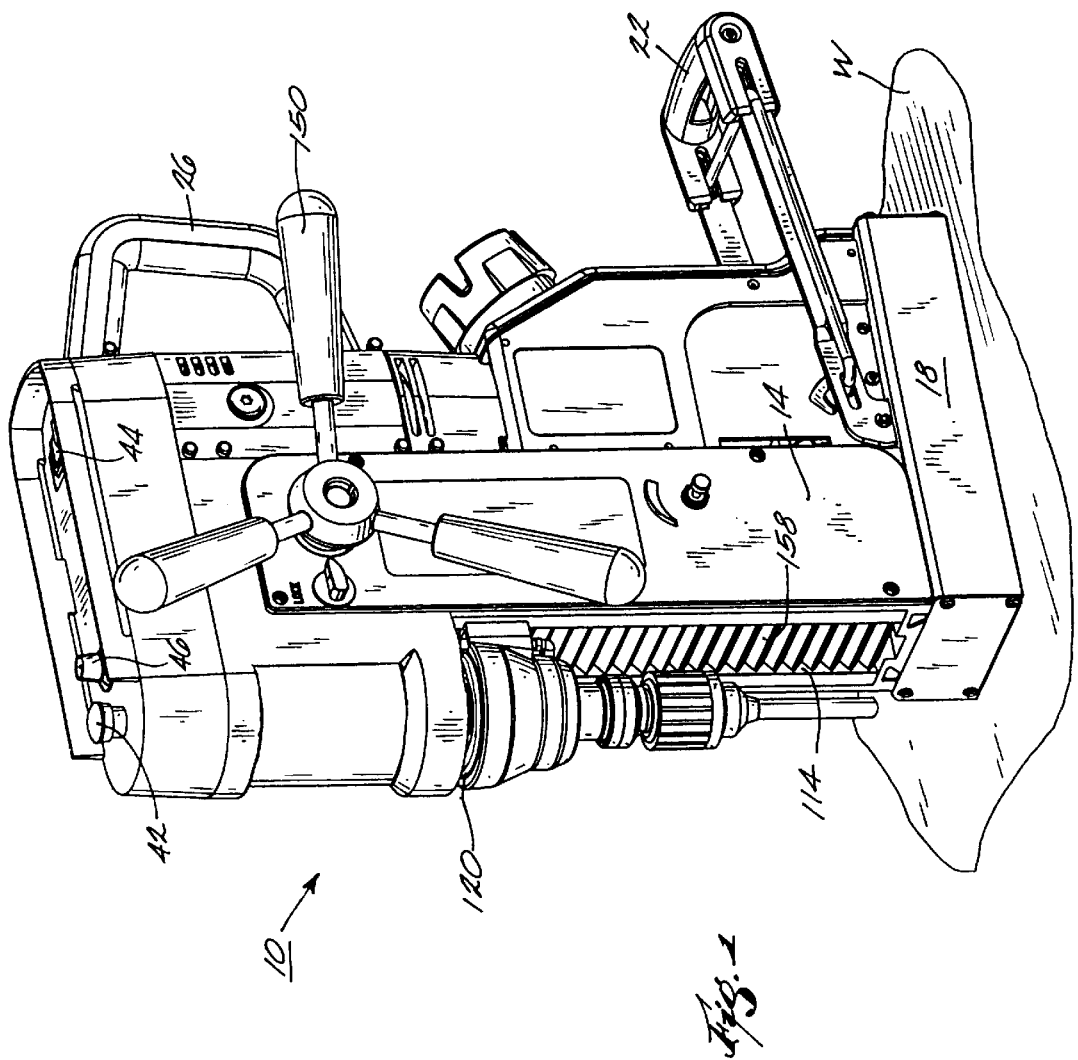
FIG. 1 is a perspective view of a drill press embodying the invention.

A power tool, such as a drill press 10, embodying the present invention is illustrated in FIG. 1. The drill press 10 generally includes a housing 14 supported by a base 18. The base 18 includes a force applying member (not shown) for connecting the base 18 to the surface of a workpiece W, and an actuating handle 22 for operating the force applying member. In the illustrated construction, the force applying member is a permanent magnet assembly (not shown) for attaching the drill press 10 to a ferro-magnetic workpiece W. In other constructions (not shown), the force applying member may be an electromagnet, a vacuum pad, or a clamp mechanism.

In the illustrated construction, the drill press 10 is a portable drill press, and the housing 14 includes a carrying handle 26 to assist the operator in moving the drill press 10 from workpiece to workpiece. However, it should be understood that the power tool could be a non-portable drill press (not shown) in which the base is supported on the floor of a work area and which includes a support surface for supporting the workpiece.

The drill press 10 includes (see FIG. 2) an electric motor 30 supported by the housing 14 and operable to rotatably drive a telescoping spindle assembly 34 about an axis 38. The motor 30 is powered by a suitable power source (not shown). An on/off lever 42 energizes the motor 30 to drive the spindle assembly 34.

The drill press 10 also includes a drive assembly for connecting the motor 30 to the spindle assembly 34. The drive assembly includes a gear assembly 46 to provide speed reduction of the motor 30. A timing belt 50 connects the gear assembly 46 to the spindle assembly 34. The belt 50 serves as a final drive for the drive assembly and is easily replaceable in case of wear.

The spindle assembly 34 includes a first spindle member 54 supported by roller bearings 58 mounted on the housing 14. The first spindle member 54 is rotatable about the axis 38 but is fixed against movement along the axis 38 relative to the housing 14. The first spindle member 54 includes a drive end 62 engaged by the belt 50. The first spindle member 54 has (see FIG. 3) a hollow inner portion 66, and grooves 70 are defined therein.

Figure 2:
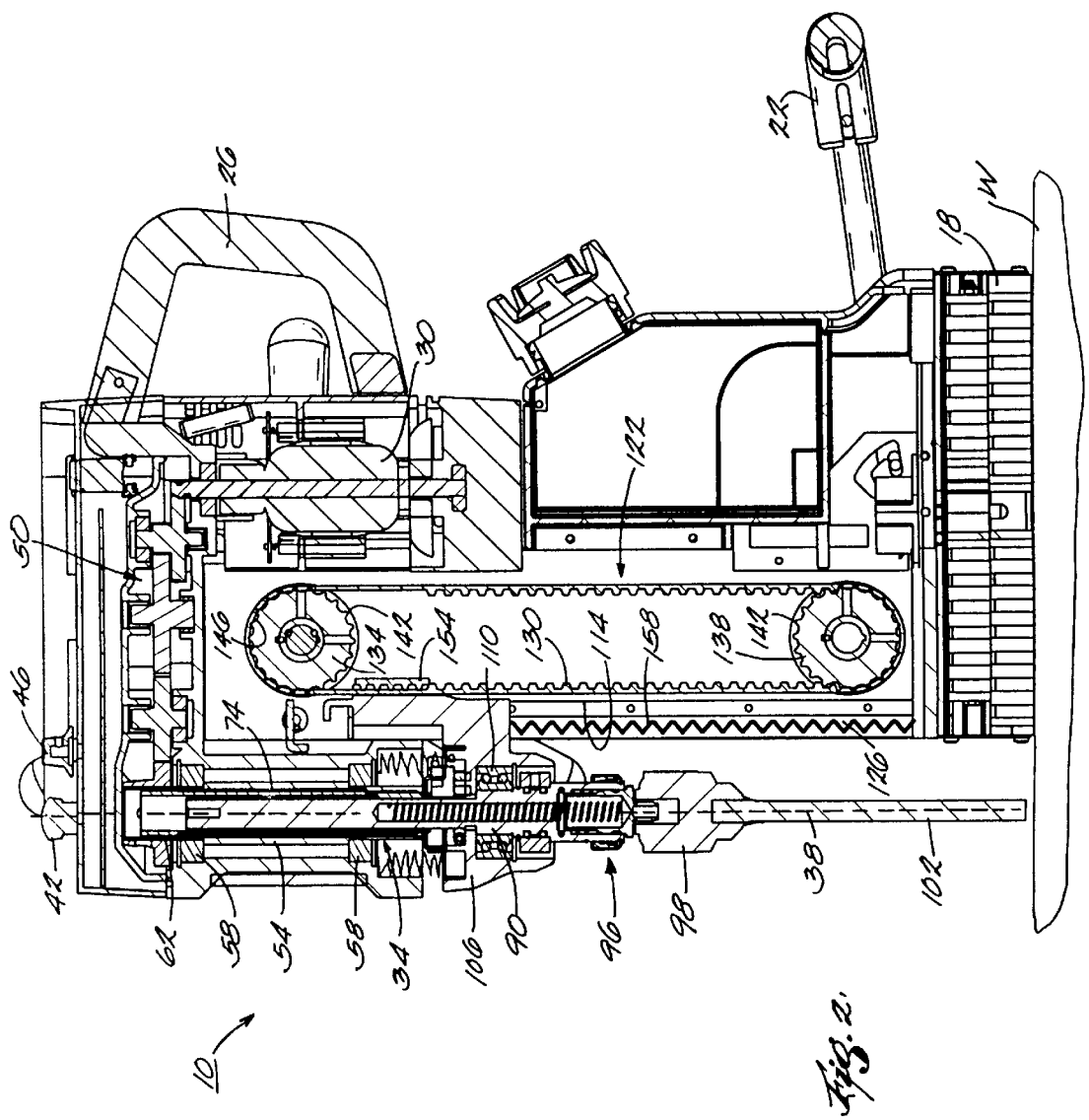
FIG. 2 is a cross-sectional side view of the drill press shown in FIG. 1 and illustrating the spindle in the raised position.
Figure 3:
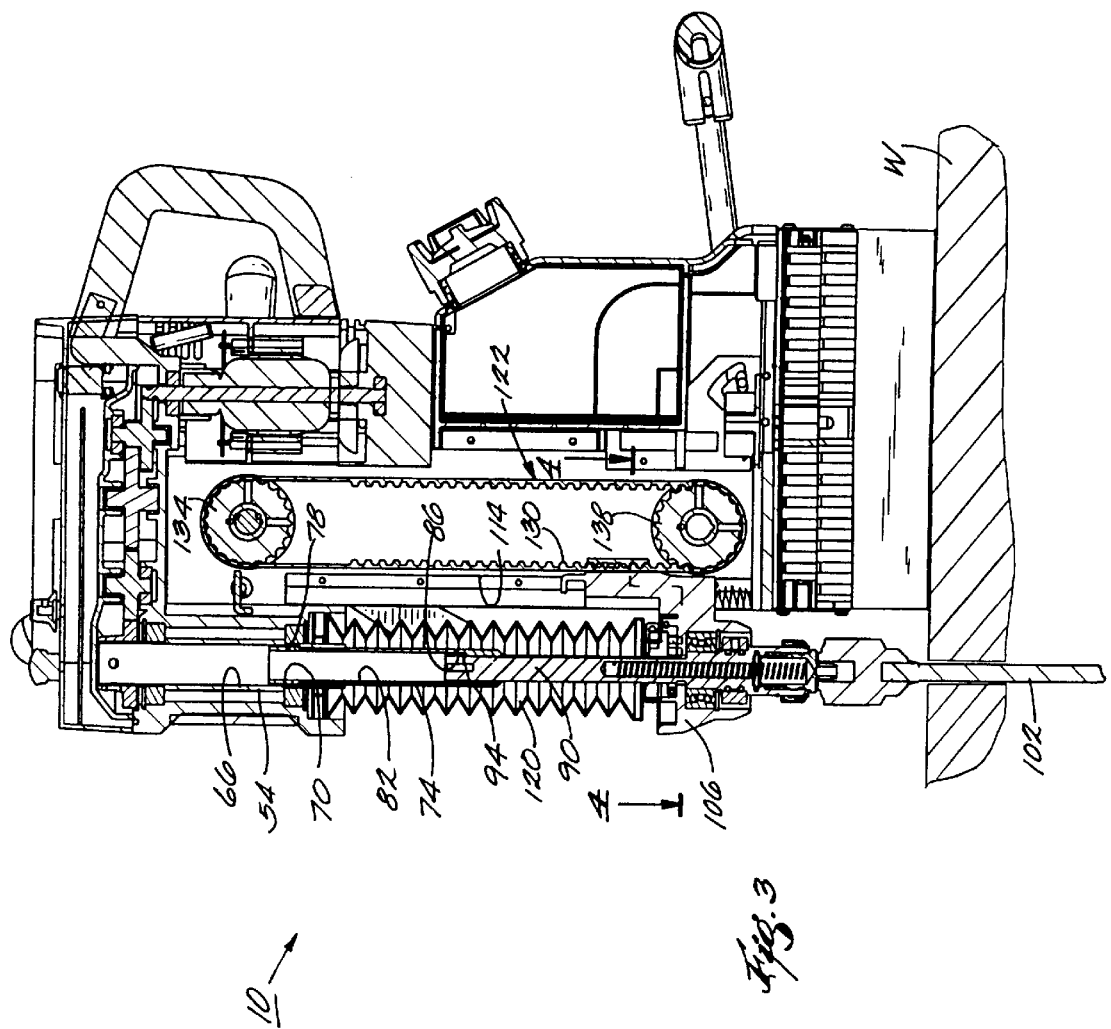
FIG. 3 is a cross-sectional side view similar to that shown in FIG. 2 and illustrating the spindle in the lowered position.

The spindle assembly 34 also includes (see FIG. 2) an intermediate spindle member 74 supported by the first spindle member 54. As shown by the change of position between FIGS. 2 and 3, the intermediate spindle member 74 telescopes into and out of the inner portion 66 of the first spindle member 54 along the axis 38. As shown in FIG. 3, splines 78 formed on the outer surface of the intermediate spindle member 74 engage the grooves 70 defined by the first spindle member 54 so that the intermediate spindle member 74 rotates with the first spindle member 54. The intermediate spindle member 74 also has a hollow inner portion 82, and grooves 86 are defined therein.

The spindle assembly 34 also includes (see FIG. 2) a second spindle member 90 supported by the intermediate spindle member 74. As shown by the change of position between FIGS. 2 and 3, the second spindle member 90 telescopes into and out of the inner portion 82 of the intermediate spindle member 74. As shown in FIG. 3, splines 94 formed on the outer surface of the second spindle member 90 engage the grooves 86 defined by the intermediate spindle member 74 so that the second spindle member 90 rotates with the intermediate spindle member 74 and the first spindle member 54.

A tool holder or chuck 98 (see FIG. 2) is supported on the lower end of the second spindle member 90. The chuck 98 supports an output element or drill bit 102 so that the drill bit 102 rotates with the spindle assembly 34. The drill bit 102 moves with the second spindle member 90 along the axis 38 so that the drill bit 102 is movable into engagement with the workpiece W (as shown in FIG. 3) and out of engagement with the workpiece W (as shown in FIGS. 1 and 2).

The drill press 10 also includes (see FIG. 2) a collar 106 supported by the housing 14 for movement along the axis 38. Roller bearings 110 mounted in the collar 106 support the second spindle member 90 so that the second spindle member 90 is rotatable relative to the collar 106. The roller bearings 110 prevent axial movement of the second spindle member 90 relative to the collar 106. The second spindle member 90 is movable with the collar 106 along the axis 38 relative to the housing 14.

Figure 4:
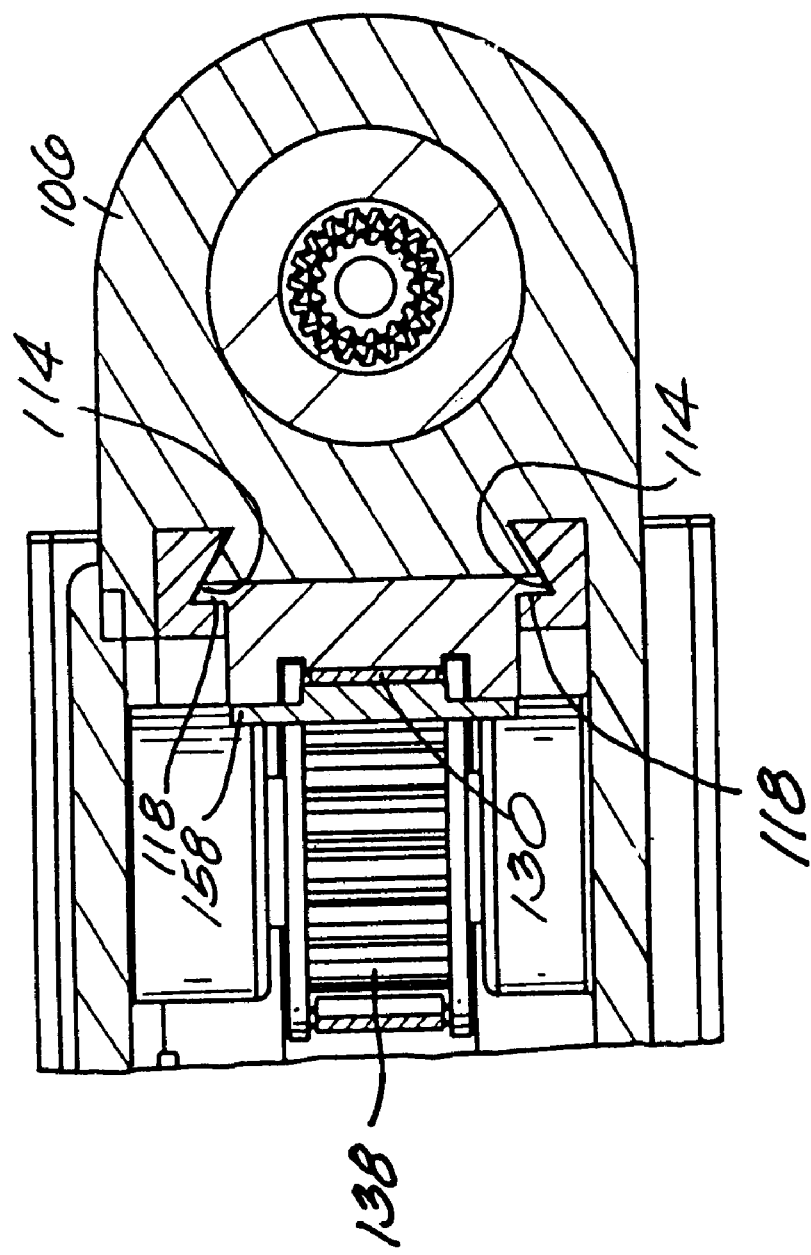
FIG. 4 is a cross-sectional view taken generally along line 4—4 in FIG. 3.

As shown in FIG. 4, a pair of tracks 114 are defined by the housing 14 and extend parallel to the axis 38. A portion 118 of the collar 106 extends into each track 114 to guide movement of the collar 106 relative to the housing 14. Engagement of the portions 118 and the tracks 114 prevents movement of the collar 106 and the second spindle member 90 transverse to the axis 38.

As shown in FIG. 3, a flexible sleeve 116 is positioned between the housing 14 and the collar 106 to cover the intermediate spindle member 74 and the second spindle member 90 as these components telescope out of the first spindle member 54. As shown in FIGS. 1 and 2, the flexible sleeve 116 is compressed as the second spindle member 90 and the intermediate spindle member 74 telescope into the first spindle member 58. The flexible sleeve 116 inhibits debris from affecting the operation of the telescoping spindle assembly 34.

The drill press 10 also includes (see FIG. 2) a feed system 122 for moving the spindle assembly 34 between a raised position (shown in FIGS. 1 and 2), in which the drill bit 102 is out of engagement with the workpiece W, and a lowered position (shown in FIG. 3), in which the drill bit 102 is engaged with the workpiece W. As shown in FIG. 2, the feed system 122 is positioned in an opening 126 defined by the housing 14 so that a portion of the feed system 122 is exposed through the opening 126.

The feed system 122 includes a flexible member in the form of an endless loop belt 130 movably supported by a feed mechanism. The belt 130 is connected to the collar 106 so that the second spindle member 90 and the collar 106 are movable with the belt 130. It should be appreciated that the flexible member can comprise other elements, such as a chain, cable, or other suitable element.

The feed mechanism includes first and second sprockets 134 and 138 rotatably supported by the housing 14. The belt 130 engages the first and second sprockets 134 and 138 so that the belt 130 is substantially tensioned between the first and second sprockets 134 and 138. Teeth 142 formed on the first and second sprockets 134 and 138 engage openings 146 formed on the belt 130 so that rotation of the first and second sprockets 134 and 138 causes movement of the belt 130. The feed mechanism also includes (see FIG. 1) a feed handle 150 connected to the first sprocket 134 to rotate the first sprocket 134 and thereby move of the belt 130.

As shown in FIG. 2, a belt retaining assembly connects the belt 130 to the collar 106 and the spindle assembly 34. The belt retaining assembly includes a belt retaining plate 154 removably connected to the collar 106 so that the belt 130 is captured between the collar 106 and the belt retaining plate 154.

A flexible barrier member 158 is positioned to cover the exposed portion of the feed system 122. The lateral edges of the barrier member 158 engage respective recesses 162 formed in the housing 14 so that the barrier member 158 covers the opening 126. The barrier member 158 inhibits debris from entering the opening 126 and affecting the operation of the feed system 122.

With the spindle assembly 34 in the raised position (shown in FIGS. 1 and 2), the barrier member 158 is in an expanded condition. As the spindle assembly 34 is moved to the lowered position (shown in FIG. 3), the collar 106 engages the upper portion of the barrier member 158 and compresses the barrier member 158. As the spindle assembly 34 returns to the raised position (shown in FIGS. 1 and 2), the barrier member 158 returns to the expanded condition. In the illustrated construction, the barrier member 158 has a corrugated configuration to enable the barrier member 158 to compress and expand.

In operation, the drill press 10 is positioned on the surface of the workpiece W. The force applying member in the base 18 is actuated to connect the base 18 to the workpiece W. When the drill press 10 is attached to the workpiece W, the spindle assembly 34 is in the raised position so that the drill bit 102 is out of engagement with the workpiece W.

Once the drill press 10 is attached to the workpiece W, the operator activates the motor 30 to rotatably drive the spindle assembly 34. To engage the drill bit 102 with the workpiece W, the operator then rotates the feed handle 150 in the counterclockwise direction (as shown in FIG. 1), causing the first sprocket 134 to rotate the belt 130. The belt 130 moves the collar 106 in a downward direction (as shown in the change in position between FIG. 2 and FIG. 3), and the intermediate spindle member 74 and the second spindle member 90 telescope out of the first spindle member 54.

Once the operator has finished a desired operation, the feed handle 150 is rotated in the clockwise direction (as shown in FIG. 3), causing the first sprocket 134 to rotate the belt 130. The belt 130 moves the collar 106 in an upward direction (as shown in the change of positions between FIG. 3 and FIG. 2), and the intermediate spindle member 74 and the second spindle member 90 telescope into the first spindle member 58. The spindle assembly 34 is moved to the raised position, and the drill bit 102 is moved out of engagement with the workpiece W.

While a drill press 10 is shown in the illustrated construction, it should be understood that the present invention is applicable to other power tools including a feed system to move an output element relative to the power tool housing and thereby engage an output element with a workpiece.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relative art are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A power tool comprising:
    a base for supporting said power tool on a surface;
    a housing supported on said base;
    a spindle positioned for movement relative to said housing along an axis and for rotation about said axis, said spindle having an end adapted to support an output element, said spindle being movable along said axis between a lowered position, in which the output element is engageable with a workpiece, and a raised position, in which said output element is out of engagement with the workpiece;
    a motor supported by said housing and operable to rotatably drive said spindle; and
    a movable flexible member interconnected with said spindle such that said spindle moves with said flexible member.

2. The power tool as set forth in claim 1 and further comprising a collar housing an end of said spindle so that said spindle is rotatable within said collar, said collar being movable relative to said housing and being connected with said flexible member so that movement of said flexible member moves said collar with said spindle.

3. The power tool as set forth in claim 2 and further comprising a retaining member connectable with said flexible member to connect said spindle to said flexible member, said retaining member including a retaining plate removably connected to said collar so that said flexible member is retained between said collar and said retaining plate.

4. The power tool as set forth in claim 2 and further comprising a track extending parallel to said axis, and wherein a portion of said collar extends into said track to prevent movement of said collar relative to said housing in a direction transverse to said axis.

5. The power tool as set forth in claim 1 wherein said flexible member is an endless belt.

6. The power tool as set forth in claim 1 and further comprising a feed mechanism including a sprocket rotatably supported by said housing, said sprocket being engaged with said flexible member such that rotation of said sprocket causes movement of said flexible member.

7. The power tool as set forth in claim 6 wherein said feed mechanism further includes a handle rotatably supported by said housing and connected to said sprocket such that rotation of said handle causes rotation of said sprocket.

8. The power tool as set forth in claim 6 wherein said feed mechanism further includes a second sprocket rotatably supported by said housing and engaged with said flexible member, said second sprocket being spaced from said first-mentioned sprocket such that said flexible member is substantially tensioned between said first-mentioned sprocket and said second sprocket.

9. The power tool as set forth in claim 1 wherein said flexible member comprises an endless loop member.

10. The power tool as set forth in claim 1 wherein said spindle includes a first spindle member axially fixed relative to said housing, and a second spindle member supported for axial movement relative to said first spindle member and relative to said housing, said second spindle member being connectable to said flexible member such that said second spindle member telescopes out of said first spindle member to move to the lowered position and such that said second spindle member telescopes into said first spindle member to move to the raised position.

11. A drill press comprising:

a base for supporting said drill press on a surface;

a housing supported on said base, said housing defining an opening;

a spindle positioned for movement relative to said housing along an axis and for rotation about said axis, said spindle having an end adapted to support an output element, said spindle being movable along said axis between a lowered position, in which the output element is engageable with a workpiece, and a raised position, in which said output element is out of engagement with the workpiece;

a motor supported by said housing and operable to rotatably drive said spindle;

a feed system for moving said spindle between the lowered position and the raised position, said feed system being supported by said housing such that a portion of said feed system is exposed through said opening; and a flexible barrier member supported by said housing to cover said exposed portion of said feed system.

12. The drill press as set forth in claim 11, wherein said barrier member has an expanded condition when said spindle is in the raised position, wherein movement of said spindle from the raised position to the lowered position compresses said barrier member, and wherein subsequent movement of said spindle from the lowered position to the raised position causes said barrier member to return to the expanded condition.

13. The drill press as set forth in claim 11 wherein said barrier member has a corrugated configuration.

14. The drill press as set forth in claim 11 wherein said feed system includes a sprocket rotatably supported by said housing, and a flexible member movably engaging said sprocket and connected to said spindle such that rotation of said sprocket moves said spindle between the lowered position and the raised position, wherein said barrier member covers a portion of said flexible member.

15. The drill press as set forth in claim 14 and further comprising:

a collar housing an end of said spindle so that said spindle is rotatable within said collar, said collar being movable relative to said housing; and a retaining member connectable with said flexible member to connect said spindle to said flexible member, said retaining member including a retaining plate removably connected to said collar so that said flexible member is retained between said collar and said retaining plate so that movement of said feed mechanism moves said collar with said spindle, wherein said barrier member is positioned between said collar and said housing.

16. The drill press as set forth in claim 11 and further comprising a recess extending parallel to said axis, and wherein a portion of said barrier member extends into said recess.

17. A drill press comprising:

a base for supporting said drill press on a surface;

a housing supported on said base, said housing defining an opening;

a spindle positioned for movement relative to said housing along an axis and for rotation about said axis, said spindle including a first spindle member fixed axially relative to said housing, and a second spindle member axially movable relative to said first spindle member and relative to said housing, said second spindle member having an end adapted to support an output element, said second spindle member being movable along said axis between a lowered position, in which the output element is engageable with a workpiece, and a raised position, in which said output element is out of engagement with the workpiece;

a motor supported by said housing and operable to rotatably drive said spindle;

a drive system supported by said housing and connected between said motor and said first spindle member;

a feed system for moving said second spindle member between the lowered position and the raised position, said feed system being supported by said housing so that a portion of said feed system is exposed through said opening, said feed system including a sprocket rotatably supported by said housing, an endless flexible member movably engaging said sprocket and connected to said spindle such that rotation of said sprocket moves said spindle between the lowered position and the raised position, a collar housing a portion of said second spindle member so that said second spindle member is rotatable relative to said collar, said collar being movable relative to said housing, and a retaining member connectable with said flexible member to connect said spindle to said flexible member, said retaining member including a retaining plate removably connected to said collar so that said flexible member is retained between said collar and said retaining plate so that movement of said feed mechanism moves said collar with said second spindle member; and a flexible barrier member supported by said housing to cover said exposed portion of said feed system, said barrier member having an expanded condition when said spindle is in the raised position, wherein movement of said spindle from the raised position to the lowered position compresses said barrier member, and wherein subsequent movement of said spindle from the lowered position to the raised position causes said barrier member to return to the expanded condition.

* * * * *